(12) United States Patent
Carbune et al.

(10) Patent No.: US 12,340,314 B2
(45) Date of Patent: Jun. 24, 2025

(54) DEVELOPING EVENT-SPECIFIC PROVISIONAL KNOWLEDGE GRAPHS

(71) Applicant: GOOGLE LLC, Mountain View, CA (US)

(72) Inventors: Victor Carbune, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/387,394

(22) Filed: Nov. 6, 2023

(65) Prior Publication Data
US 2024/0070478 A1 Feb. 29, 2024

Related U.S. Application Data

(63) Continuation of application No. 17/572,903, filed on Jan. 11, 2022, now Pat. No. 11,853,902, which is a
(Continued)

(51) Int. Cl.
*G06N 5/02* (2023.01)
*G06F 40/205* (2020.01)
(Continued)

(52) U.S. Cl.
CPC ............. *G06N 5/02* (2013.01); *G06F 40/205* (2020.01); *G06F 40/295* (2020.01); *G06F 40/35* (2020.01); *H04L 51/046* (2013.01)

(58) Field of Classification Search
CPC ........ H04L 51/046; G06N 7/01; G06N 20/10; G06Q 50/01
See application file for complete search history.

(56) References Cited

U.S. PATENT DOCUMENTS

| 7,240,049 B2 | 7/2007 | Kapur |
| 8,468,163 B2 * | 6/2013 | Gupta .................. G06F 16/903 707/758 |

(Continued)

FOREIGN PATENT DOCUMENTS

| CN | 106462608 | 2/2017 |
| CN | 107391521 | 11/2017 |

(Continued)

OTHER PUBLICATIONS

Abulaish et al.; A Multi-Attributed Graph-Based Approach for Text Data Modeling and Event Detection in Twitter; 11th International Conference on Communication System and Networks; dated Jan. 2019.
(Continued)

*Primary Examiner* — Jesse S Pullias
(74) *Attorney, Agent, or Firm* — Gray Ice Higdon

(57) ABSTRACT

Techniques and a framework are described herein for constructing and/or updating, e.g., on top of a general-purpose knowledge graph, an "event-specific provisional knowledge graph." In various implementations, live data stream(s) may be analyzed to identify entity(s) associated with a developing event. The entity(s) may form part of a general-purpose knowledge graph that includes entity nodes and edges between the entity nodes. Based on the identified one or more entities, an event-specific provisional knowledge graph may be constructed or updated in association with the developing event. In some implementations, the event-specific provisional knowledge graph may be queried for new information about the developing event. Computing devices may be caused to render, as output, the new information.

17 Claims, 9 Drawing Sheets

Related U.S. Application Data continuation of application No. 16/622,555, filed as application No. PCT/US2019/038940 on Jun. 25, 2019, now Pat. No. 11,256,992.

(51) Int. Cl.
- *G06F 40/295* (2020.01)
- *G06F 40/35* (2020.01)
- *H04L 51/046* (2022.01)

(56) References Cited

U.S. PATENT DOCUMENTS

| | | | |
|---|---|---|---|
| 8,739,016 B1 * | 5/2014 | Goldman | H04L 12/1813 715/200 |
| 8,760,290 B2 | 6/2014 | Piett et al. | |
| 9,348,815 B1 | 5/2016 | Estes et al. | |
| 11,256,992 B2 | 2/2022 | Carbune et al. | |
| 11,803,531 B1 * | 10/2023 | Gilger | G06F 16/219 |
| 2013/0238356 A1 | 9/2013 | Torii et al. | |
| 2013/0297688 A1 | 11/2013 | Zheng | |
| 2014/0129544 A1 | 5/2014 | Haugen et al. | |
| 2014/0214832 A1 | 7/2014 | Nandakumar et al. | |
| 2015/0081648 A1 * | 3/2015 | Zillner | G06F 16/2365 707/690 |
| 2015/0302019 A1 | 10/2015 | Takeda | |
| 2016/0034712 A1 | 2/2016 | Patton et al. | |
| 2017/0024375 A1 | 1/2017 | Hakkani-Tur et al. | |
| 2017/0083386 A1 | 3/2017 | Wing et al. | |
| 2017/0098283 A1 | 4/2017 | Rajan et al. | |
| 2017/0193064 A1 | 7/2017 | Judd et al. | |
| 2017/0255536 A1 | 9/2017 | Weissinger et al. | |
| 2017/0316175 A1 | 11/2017 | Hu | |
| 2017/0337268 A1 * | 11/2017 | Ait-Mokhtar | G06F 16/3344 |
| 2018/0144055 A1 | 5/2018 | Wu | |
| 2018/0189399 A1 | 7/2018 | Popescul et al. | |
| 2018/0349787 A1 | 12/2018 | Horling et al. | |
| 2020/0320105 A1 * | 10/2020 | Korpman | G06F 16/9024 |
| 2020/0372402 A1 | 11/2020 | Kursun et al. | |
| 2020/0372403 A1 | 11/2020 | Kursun et al. | |
| 2022/0138591 A1 | 5/2022 | Carbune et al. | |

FOREIGN PATENT DOCUMENTS

| | | | | |
|---|---|---|---|---|
| WO | WO-2017135889 A1 * | 8/2017 | | |
| WO | WO-2018200979 A1 * | 11/2018 | | G06F 16/242 |

OTHER PUBLICATIONS

Repp et al.; Extracting News Events from Microblogs; arXiv:1806.07573v1; dated Jun. 20, 2018.

Rospocher et al.; Building event-centric knowledge graphs from news; Web Semantics: Science, Services and Agents on the World Wide Web 37-38/132-151; dated 2016.

Shekarpour et al.; Principles for Developing a Knowledge Graph of Interlinked Events from News Headlines on Twitter; arXiv:1808.02022v1; dated Aug. 6, 2018.

Tonon et al.; Arma Tweet: Detecting Events by Semantic Tweet Analysis; European Semantic Web Conference; dated 2017.

Rudinac et al.; Multimodal Classification of Violent Online Political Extremism Content with Graph Convolutional Networks; Proceedings of the on Thematic Workshops of ACM Multimedia 2017; pp. 245-252; XP093064096; doi: 10.1145/3126686.3126776; ISBN: 978-1-4503-5416-5; Retrieved from the Internet: URL:https://dl.acm.org/doi/pdf/10.1145/3126686.3126776; dated Oct. 23, 2017.

Deligiannis N. et al.; Deep Learning for Geolocating Social Media Users and Detecting Fake News; XP093064092; Retrieved from the Internet: URL:https://www.sto.nato.int/publications/STP%20Meeting%20Proceedings/STO-MP-IST-160/MP-IST-160-S3-5.pdf; dated Jan. 1, 2018.

Oshikawa et al.: A Survey on Natural Language Processing for Fake News Detection; arxiv.org; Cornell University Library; XP081045185; dated Nov. 2, 2018.

LePhuoc, D et al., "The Graph of Things: A step towards the Live Knowledge Graph of connected things;" Web Semantics: Science, Services and Agents on the World Wide Web; vol. 37; pp. 25-35; Mar. 1, 2016.

Steiner, T. et al., "Adding Realtime Coverage to the Google Knowledge Graph;" CEUR Workshop Proceedings; vol. 914; 4 pages; Oct. 3, 2012.

Jia, Y. et al., "OpenKN: An Open Knowledge Computational Engine for Network Big Data;" 2014 IEEE/ACM International Conference on Advances in Social Networks Analysis and Mining (ASONAM 2014); pp. 657-664; Aug. 17, 2014.

European Patent Office; International Search Report and Written Opinion of PCT application Ser. No. PCT/US2019/038940; 16 pages; dated Mar. 19, 2020.

European Patent Office; International Search Report and Written Opinion of Ser. No. PCT/US2019/038935; 15 pages; dated Dec. 12, 2019.

China National Intellectual Property Administration; Notification of First Office Action issued in Application No. 201980096365.X; 17 pages; dated Jul. 24, 2024.

European Patent Office; Communication pursuant to Article 94(3)EPC issued in Application No. 19740142.5; 9 pages; dated Apr. 8, 2024.

China National Intellectual Property Administration; Notification of Second Office Action issued in Application No. 201980096365.X; 5 pages; dated Jan. 8, 2025.

* cited by examiner

DEVELOPING EVENT-SPECIFIC PROVISIONAL KNOWLEDGE GRAPHS

BACKGROUND

With the proliferation of internet-enabled devices such as smart phones and smart watches, it is increasingly common for information about newly-developing, or "live," events to be disseminated by witnesses using live data streams such as social media posts, search engine queries, digital image posts, etc. This often occurs even before publication of such information by traditional news outlets. Data structures known as "knowledge graphs" may be used, e.g., by search engines, to manage knowledge about entities and relationships between entities. An entity may be a person, place, or thing (e.g., an event). Some knowledge graphs may include nodes that represent entities and edges that represent relationships between entities. However, with developing events such as sporting events, disasters, protests, etc., the knowledge graph may not be updated in real time to reflect current information. Because there may be numerous live data streams conveying information about a developing event, a duplicative and/or contradictory data from may be received from multiple sources.

SUMMARY

Techniques and a framework are described herein for gathering information about developing events from multiple live data streams and pushing new pieces of information about the developing events to interested individuals, or "subscribers." More particularly, techniques are described herein for constructing and/or updating, e.g., on top of a general-purpose knowledge graph, an "event-specific provisional knowledge graph." This event-specific provisional knowledge graph may organize individual-published information into entity nodes and edges, similar to the general-purpose knowledge graphs. However, the event-specific provisional knowledge graph may, as its name suggests, be "provisional" or "ephemeral" in nature because the entities and/or relationships represented by at least some of its nodes may not yet be deemed sufficiently corroborated or verified for inclusion in the general-purpose knowledge graph. Accordingly, those uncorroborated and/or unverified entities and/or relationships may be represented by entity nodes and/or edges of the event-specific provisional knowledge graph that are, at least for some time after the outset of the developing event, not present in the general-purpose knowledge graph. Put another way, the general-purpose knowledge graph may lag behind the event-specific provisional knowledge graph in terms of having information about the developing event.

This event-specific provisional knowledge graph provides functional data that may be leveraged to collate, de-duplicate, and disseminate information that is related to existing data associated with a general-purpose knowledge graph. The event-specific provisional knowledge graph in combination with the general-purpose knowledge graph enables a computing device to automatically identify and output event-specific data associated with an entity. Providing different knowledge graphs associated with an entity may, for example, allow the computing device to automatically present event-specific information associated with the entity in an appropriate format.

The information may be disseminated, e.g., to users who have expressed interest, individual-published information about developing and/or live events, such as disasters, sporting events, protests, gatherings (spontaneous or otherwise), and so forth. For example, as a newsworthy event unfolds, live event streams such as social media posts from witnesses or others purporting to have knowledge of the event may be analyzed to identify one or more entities associated with the event. Although the event itself may eventually be represented in the general-purpose knowledge graph as an entity-node, there may be some delay before the general-purpose knowledge graph is updated. Prior to such an update, the developing event may be at least temporarily represented in the event-specific provisional knowledge graph, e.g., by one or more entity nodes or edges between entity nodes. The provided data structure allows information relating to an event to be made available prior to information being updated. It may additionally or alternatively be desirable for event-specific information to be temporary and the provided data structure may provide a temporary structure that can be used to output information without modification of existing stored data. In some implementations, the event-specific provisional knowledge graph may be available to all individuals, or at least to multiple individuals. It is not necessarily associated with any particular individual.

In some implementations, multiple live data streams may be crawled to identify a subset of live data streams relevant to a developing event. Content from each of the subset of live data streams may then be processed using various data processing pipelines to populate the event-specific provisional knowledge graph and, ultimately, to disseminate new information about the developing event to interested persons (which may be referred to as "event subscribers"). For example, one or more of these data processing pipelines may be used to parse and/or natural language process (e.g., to identify topics and/or entities) the live data streams, and to merge and/or de-duplicate data from multiple live streams for incorporation into the event-specific provisional knowledge graph. Once updated, the event-specific provisional knowledge graph may be queried, e.g., periodically or continuously, to determine new information about the event to disseminate to event subscribers.

Developing events may be initially identified in various ways. In some implementations, one or more individuals may submit queries to a search engine seeking information about a developing event, such as "Is there a fire at the cathedral?" or "Why is a crowd gathering at Times Square?" If enough queries, e.g., a cluster of semantically-related queries, evidence a newly-developing event, that may trigger analysis of multiple live data streams, such as social media posts, to obtain information to populate an event-specific knowledge graph. As another example, multiple live streams such as social media posts may be analyzed on an ongoing basis. Similar to clusters of semantically-related queries, if a sufficient number or cluster of semantically-related posts are identified, that may evidence a newly-developing event. In yet other implementations, particular live data streams, e.g., from trusted individuals/organizations such as first responders, may be monitored for newly-developing events.

A particular individual may be selected to receive updates about a developing event—i.e. be "subscribed" to the developing event—from the event-specific provisional knowledge graph in various ways. In some implementations, the individual may be one of the people that issued an early query related to the developing event, like those queries described previously ("Is there a fire at the cathedral?" or "Why is a crowd gathering at Times Square?"). As more information about the developing event is learned, and the event-specific provisional knowledge graph is updated, the individual may receive updates with information that has not yet been presented to them. More generally, in some implementations, an individual that issues a query about the developing event, regardless of whether that individual's query contributed to the initial detection of the developing event, may effectively cause that individual to be "subscribed" to receiving updates from the event-specific provisional knowledge graph as they become available. In other cases, individuals may be subscribed to receive updates on developing events automatically, e.g., based on those individuals' interests aligning with event "types" of the developing events.

In some implementations, a method is provided that includes: analyzing two or more live data streams; based on the analyzing, identifying one or more entities associated with a developing event, wherein the one or more entities form part of a general-purpose knowledge graph that includes a plurality of entity nodes and a plurality of edges between the plurality of entity nodes, wherein the plurality of entity nodes represent entities and the plurality of edges represent relationships between the entities; based on the identified one or more entities, constructing or updating an event-specific provisional knowledge graph associated with the developing event, wherein the event-specific provisional knowledge graph shares one or more entity nodes with the general-purpose knowledge graph, and wherein the event-specific provisional knowledge graph includes one or more additional nodes or edges, not found in the general-purpose knowledge graph, that convey a relationship between the identified one or more entities and the developing event; and in response to the constructing or updating, querying the event-specific provisional knowledge graph for new information about the developing event; and causing one or more computing devices to render, as output, the new information.

These and other implementations of technology disclosed herein may optionally include one or more of the following features.

In various implementations, the method further includes: receiving a user query seeking information relating to the developing event; and analyzing a superset of live data streams based on the user query to identify the set of two or more live data streams as relevant to the developing event. In various implementations, the method further includes receiving a user query seeking information relating to the developing event; wherein the querying comprises querying the event-specific provisional knowledge graph based on the user query. In various implementations, the method further includes determining that the general-purpose knowledge graph does not include information responsive to the user query. In various implementations, the analyzing is responsive to the determining.

In various implementations, the two or more live data streams include one or more postings from a witness of the developing event. In various implementations, the method further includes detecting the developing event based on the analyzing. In various implementations, the method further includes determining an event type of the developing event based on the analyzing. In various implementations, the causing comprises: determining that a given user is interested in receiving information about events having the event type; and based on determining that the given user is interested, pushing data indicative of the new information to a computing device operated by the given user. In various implementations, the pushing causes the computing device operated by the given user to render, at one or more output components, the new information without the given user explicitly requesting the new information about the developing event. In various implementations, determining the event type comprises determining that the one or more additional nodes or edges that are not found in the general-purpose knowledge graph match an event type template associated with the event type.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
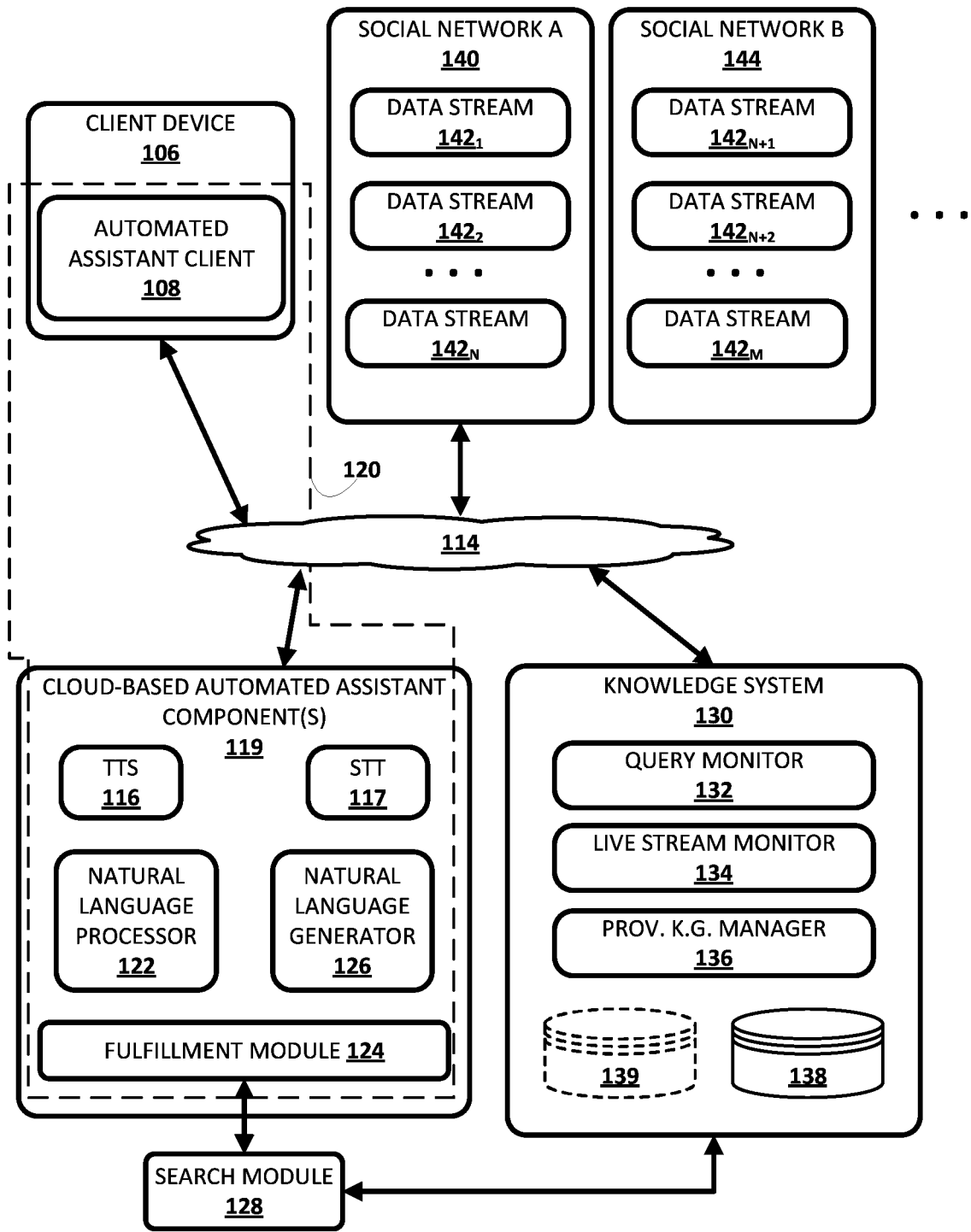
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sake of brevity and simplicity, the term "automated assistant" is used herein as "serving" a particular user will refer to the combination of an automated assistant client 108 executing on a client device 106 operated by the user and one or more cloud-based automated assistant components 119 (which may be shared amongst multiple automated assistant clients 108).

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In many implementations, automated assistant 120 may employ speech recognition processing to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

Text-to-speech ("TTS") module 116 may be configured to convert textual data (e.g., natural language responses formulated by automated assistant 120) into computer-generated speech output. Speech-to-text ("STT") module 117 may be configured to convert captured audio data into text. In some implementations, this text (or alternatively, an embedding thereof) may then be provided to a natural language processor 122. In some implementations, STT module 117 may convert an audio recording of speech to one or more phonemes, and then convert the one or more phonemes to text. Additionally or alternatively, in some implementations, STT module 117 may employ a state decoding graph.

Automated assistant 120 (and in particular, cloud-based automated assistant components 119) may include the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, one or more of the components of automated assistant 120, such as natural language processor 122, TTS module 116, STT module 117, etc., may be implemented at least in part on client device 106 (e.g., to the exclusion of the cloud).

In some implementations, automated assistant 120 generates responsive content in response to various inputs generated by a user of client device 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input. In some implementations, natural language process 122 may be configured to ultimately predict the user's intent based on the user's natural language input.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 122 may additionally and/or alternatively include a coreference resolver (not depicted) configured to group, or "cluster," references to the same entity based on one or more contextual cues.

In some implementations, data about entities may be stored in one or more databases, such as in a general-purpose knowledge graph 138 (which is part of a separate knowledge system 130 in FIG. 1). In some implementations, general-purpose knowledge graph 138 may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

Fulfillment module 124 (also referred to as a "query processor" or "resolution module") may be configured to receive a predicted/estimated intent that is output by natural language processor 122 and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. In some implementations, the fulfillment information may be provided to a natural language generator ("NLG" in some Figs.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 128 configured to search corpuses of documents and/or other data sources (e.g., knowledge graph 138, etc.), e.g., of a knowledge system 130, for responsive information. Fulfillment module 124 may provide data indicative of the search query (e.g., the text of the query, a reduced dimensionality embedding, etc.) to search module 128. Search module 128 may provide responsive information, such as GPS coordinates, or other more explicit information, such as "Timberline Lodge, Mt. Hood, Oregon." This responsive information may form part of the fulfillment information generated by fulfillment module 124.

Knowledge system 130 may include one or more computing devices, such as one or more server computers (e.g., blade servers) acting in cooperation to assemble knowledge from various sources (e.g., web crawling through databases of documents), and to provide various services and information to requesting entities. Knowledge system 130 may act as, among other things, a search engine that provides responsive information (e.g., search results, directly responsive information, deep links, etc.) to search queries received from individuals and/or from automated assistant 120. Knowledge system 130 may perform a variety of other services as well, and therefore is not limited to those components depicted in FIG. 1.

Knowledge system 130 may include the knowledge graph 138 mentioned previously, as well as a query monitor 132, a live stream monitor 134, and/or a provisional knowledge graph manager ("Prov. K.G. Manager" in FIG. 1) 136. In some implementations, knowledge system 130 may, among other things, receive search queries and provide responsive information. In various implementations, query monitor 132 may be configured to monitor queries submitted to, e.g., a search engine such as knowledge system 130, and to cluster queries that are semantically related to each other and/or to developing events together. Clusters of semantically-related queries may then be leveraged to provide interested users with evolving information about developing events, e.g., from other queries and/or from live data streams.

As mentioned previously, information about newly developing events such as disasters, crimes, impromptu gatherings (e.g., protests), accidents, etc., may not be immediately available from traditional information sources such as general-purpose knowledge graph 138 or from other data sources often utilized by search engines. Rather, these traditional data sources tend to lag behind other more nimble sources such as live data streams. Accordingly, in various implementations, live stream monitor 134 may be configured to monitor a plurality of live data streams to detect developing events.

As used herein, a "live data stream" may include an information stream generated by one or more individuals (e.g., by an entity such as a business or government organization) that includes a plurality of updates generated over time. These updates may include text, images, videos, audio recordings, or any other form of user-created, user-curated, and/or user-compiled information that is capable of being disseminated to other individuals who have access to these live data streams. A ubiquitous form of live data stream update is a social media post, in which the posting user can include text, audio data, video data, image data, hyperlinks, applets, etc.

In FIG. 1, for instance, a first social network 140 may provide, e.g., from a plurality of users of the first social network 140, a first plurality of live data streams $142_{1-N}$. Each live data stream 142 may be generated by a person or persons associated with a social media profile of the first social network 140. Similarly, a second social media network 144 may provide, e.g., from a plurality of users of the second social network 144, a second plurality of live data streams $142_{N+1}$-$142_M$. N and M are positive integers. While two social networks are depicted in FIG. 1, this is not meant to be limiting. Any number of social networks of various types may provide live data streams.

Some social networks may be designed to primarily allow users to create posts that are constrained to some number of characters, words, images, etc., and to allow other users to "follow" the posting users, even if the other users do not personally know the posting users. For example, with some social networks, many users may follow (or subscribe to) a smaller number of "influencers" who are often celebrities or are otherwise well-known (e.g., politicians, news reporters). These influencers are less likely to follow (or subscribe to) their followers' live data streams, unless those followers are personal acquaintances of the influencer or are other influencers. By consistently disseminating information that followers find compelling or otherwise valuable, influencers can, in some cases, gain credibility and/or generate income based on their social media posts.

Other social networks may be designed to primarily allow users to connect to (or "befriend") other users that they know or meet in real life. Once connected, users are able to share content such as text, images, videos, audio, hyperlinks, etc. with their "friends" or "contacts" on social media. These other social networks may be used by users to connect with friends on an informal basis, and/or to connect with business acquaintances on a more formal basis (e.g., akin to a virtual rolodex).

Although not depicted in FIG. 1, other systems that are similar to social networks may also be sources of live data streams. For example, users may have accounts on, and post videos to, video-sharing websites. In some instances, these video sharing websites may allow users subscribe to other users' video updates, similar to some of the social networks described previously. Thus, for instance, a particular user who regularly or periodically posts videos may, in effect, create a live stream. Other similar websites are designed specifically to enable users to post images, particularly media that spreads ideas, activities, concepts, jokes, catch-phrases, or other information, commonly referred to as Internet "memes."

Based on information obtained from query monitor 132 and/or live stream monitor 134, provisional knowledge graph manager 136 may be configured to build, manage, and/or maintain one or more event-specific provisional knowledge graphs 139. In some implementations, each event-specific provisional knowledge graph 139 may be built for a specific developing event, e.g., before more traditional data sources such as "regular" or "general-purpose" knowledge graph 138 are updated to include information about the developing event. For example, information added to event-specific provisional knowledge graph 139 may not be (as heavily) subjected to the journalistic or other standards described previously. In some implementations, event-specific provisional knowledge graph 139 may be implemented, e.g., by provisional knowledge graph manager 136, as a layer on top of general-purpose knowledge graph 138.

In some implementations, a given event-specific provisional knowledge graph 139 may be temporary or "ephemeral" in nature (hence, event-specific provisional knowledge graph 139 being rendered in dashed lines in FIG. 1). In some such implementations, the information added to event-specific provisional knowledge graph 139 may eventually be added to knowledge graph 138, e.g., once that information is sufficiently corroborated. Additionally or alternatively, to the extent any information (e.g., facts) in the event-specific provisional knowledge graph 139 is not able to be corroborated or verified, it may eventually be dropped or replaced with verifiable information.

Suppose an abandoned roller skating rink collapses, but initial live stream updates (e.g., social media posts) from one or more witnesses mistakenly identify the collapsed structure as an abandoned bowling alley. In various implementations, the location or building associated with the developing event will be identified initially in event-specific provisional knowledge graph 139 as a bowling alley. However, when later information contradicts that fact and correctly reports that the collapsed structure was a skating rink, and not a bowling alley, may be added to and/or updated within event-specific provisional knowledge graph 139 to reflect its status of "collapsed."

Figure 2:
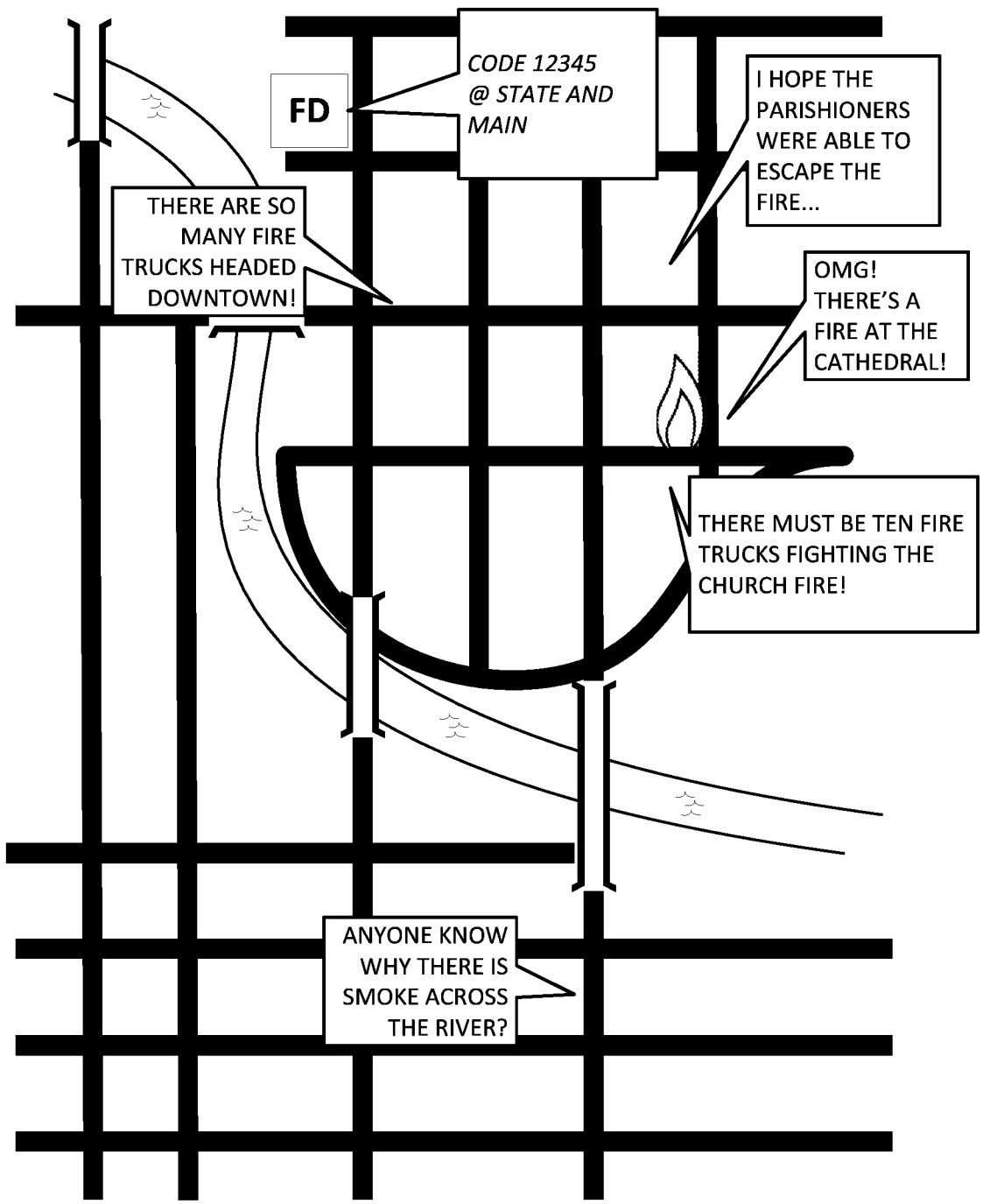
FIG. 2 depicts an example scenario in which techniques described herein may be employed to detect a developing event based on semantically-related data detected at multiple live data streams.

FIG. 2 depicts an example scenario in which techniques described herein may be employed, e.g., by live stream monitor 134, to detect a developing event based on semantically-related data detected at multiple live data streams (e.g., $142_{1-M}$). FIG. 2 schematically depicts an overhead view of a portion of a city, with the black lines representing roads and a river winding from top left to bottom middle right. As indicated by the flame, a fire has broken out at a cathedral located in an eastern portion of the city.

In the earliest stages of this fire, e.g., when it is first detected by one or more witnesses, it is unlikely that traditional data sources such as knowledge graph 138 or search engines will have information available about the fire. During this period the fire can be thought of as a "developing event" for which information is being gathered by multiple sources. These sources may disseminate this information by way of live data streams. Live stream monitor 134 may employ techniques described herein to determine a likelihood that a new event is developing. If the likelihood satisfies some criterion, such as a minimum threshold, live stream monitor 134 may provide "provisional" information about the developing event to provisional knowledge graph manager 136. Provisional knowledge graph manager 136 may organize the information into nodes and edges of an event-specific provisional knowledge graph 139, similar to those found in general-purpose knowledge graph 138. Subsequently, the event-specific provisional knowledge graph 139 may be queried, e.g., by various components, for information about the developing event.

In FIG. 2, a first user very close to the fire has posted to social media, "OMG! There's a fire at the cathedral!" Another nearby user posts, "There must be ten fire trucks fighting the church fire!" Yet another nearby users posts, "I hope the parishioners were able to escape the fire . . . " In various implementations, live stream monitor 134 may analyze a plurality of live streams, include these three live streams, to determine that a developing event is likely occurring. Live stream monitor 134 may syntactically and/or semantically process, or have another system syntactically and/or semantically process, these live data stream updates to determine that they are related. For example, live stream monitor 134 may generate embeddings of these live stream updates and determine that they are related based on the fact that the embeddings cluster together in a latent space.

In some implementations, live stream monitor 134 may consider other informational signals besides the live stream updates in determining whether a developing event is occurring. For example, in FIG. 2, live stream monitor 134 may determine, e.g., from position coordinates (e.g., GPS) generated by mobile devices operated by the three different users, that the three users are near each other. Live stream monitor 134 may additionally or alternatively determine that the three live stream updates are temporally proximate, e.g., within minutes or even seconds of each other. Combined with the syntactic and/or semantic similarity of their live stream updates, live stream monitor 134 may determine not only that a developing event is unfolding, but that the developing event is unfolding somewhere proximate to these three users. Yet other informational signals may also be considered in addition to or instead of those just mentioned, including but not limiting to demographic information about posting users (e.g., ages, genders), known preferences or interests of posting users (e.g., determined from their online profiles), known affiliations of posting users (e.g., alma maters, organizations, employers), and so forth.

The first three posting users described above are relatively close to the fire in FIG. 2. In some implementations, their posts may be sufficient to determine with a reasonable amount of confidence that a developing event (the cathedral fire) is occurring. However, other users that are farther away spatially and/or temporally from the fire may also update their live streams with potentially-relevant information. These farther-removed users may have less direct knowledge of the fire, and instead may possess circumstantial knowledge of the fire. For example, another user a few blocks west of the fire posts, "There are so many fire trucks headed downtown!" This user may not know that a cathedral in particular is on fire, but can surmise that there is a fire somewhere downtown based on the trajectories of the firetrucks he or she observed. As another example, a user south of the river posts, "Anyone know why there is smoke across the river?" Again, the southern user may not know which building(s) are ablaze but can probably surmise that a fire is occurring.

Whether or how useful the farther-removed users' live stream updates are may depend on whether they include additional information that is not available in live stream updates from users more proximate (spatially or temporally) to the developing event. Suppose the western user's post, "There are so many fire trucks headed downtown!" occurs and/or is detected by live stream monitor 134 before the post from the more spatially proximate user, "There must be ten fire trucks fighting the church fire!" The western user's post may signal that the fire is likely relatively large, whereas the other two posts from the other two spatially-proximate users ("I hope the parishioners . . . " and "OMG! There's a fire . . . ") only establish that there is a fire, not its potential size.

In some implementations, particular live data streams may be considered more reliable than others. In some cases, updates posted to particularly reliable live data streams may trigger live stream monitor 134 to search other lesser-known live data streams for additional information. For example, in FIG. 2, a fire department ("FD") publishes its own live stream update, "CODE 12345 @ STATE AND MAIN." Assuming "CODE 12345" corresponds to a fire, such a post may be considered highly reliable due to its source being an official government agency, rather than a lesser-known individual. Notably, the post does not indicate that it is the cathedral that is on fire, but instead simply states the location as "STATE AND MAIN." Assuming there are other buildings in that area, it may not be possible to conclude from the fire department's post alone that the cathedral is on fire. However, when combined with other corroborating posts that indicate the cathedral is on fire, live stream monitor 134 may become very confident that a developing event of a fire at the cathedral is occurring. Although it is possible that the fire department received a false alarm, and so even its post may not necessarily be considered dispositive or conclusive by live stream monitor 134.

In some implementations, live stream monitor 134 may monitor various live streams as a matter of course. For example, live stream monitor 134 may continuously or periodically monitor live streams known as being particularly timely and/or reliable, such as live streams generated by first responders, reporters, influencers, government entities, etc. Additionally or alternatively, live stream monitor 134 may begin monitoring some set of live data streams 142 in response to various events. These live data streams may be selected, for instance, at random, from known-reliable live data streams, from live data streams known to have some spatial or other relationship to the developing event, etc.

Suppose knowledge system 130 receives a user query seeking information relating to a developing event, and that knowledge system 130 is unable to find responsive information in its traditional data sources, such as general-purpose knowledge graph 138 and/or documents it has crawled and indexed. In some such implementations, query monitor 132 may determine that a new developing event might be occurring. Query monitor 132 may notify live stream monitor 134. Live stream monitor 134 may respond by selecting and monitoring/analyzing a set of live data streams 142 based on the user query to identify a subset of two or more live data streams as relevant to the developing event.

Suppose knowledge system 130 receives a search query asking, "Who is rioting in Times Square?" Suppose further that the riot occurring in Times Square began so recently that traditional data sources such as knowledge graph 138 and/or documents indexed/crawled by knowledge system 130 do not yet have responsive information. Live stream monitor 134, e.g., triggered by query monitor 132, may select a set of live data streams that are most likely to provide new information about this potential developing event. For example, live stream monitor 134 may select one or more live streams 142 that include recent updates generated by computing devices that are geographically proximate to Times Square, which might be operated by first-hand witnesses to the developing event. Live stream monitor 134 additionally or alternatively may select other live data streams 142 known to be relevant with Times Square, such as live data streams 142 generated by entities such as businesses, government agencies, etc., that are geographically proximate to or otherwise related to Times Square (e.g., departments of commerce, aldermen live feeds, etc.).

Figure 3:
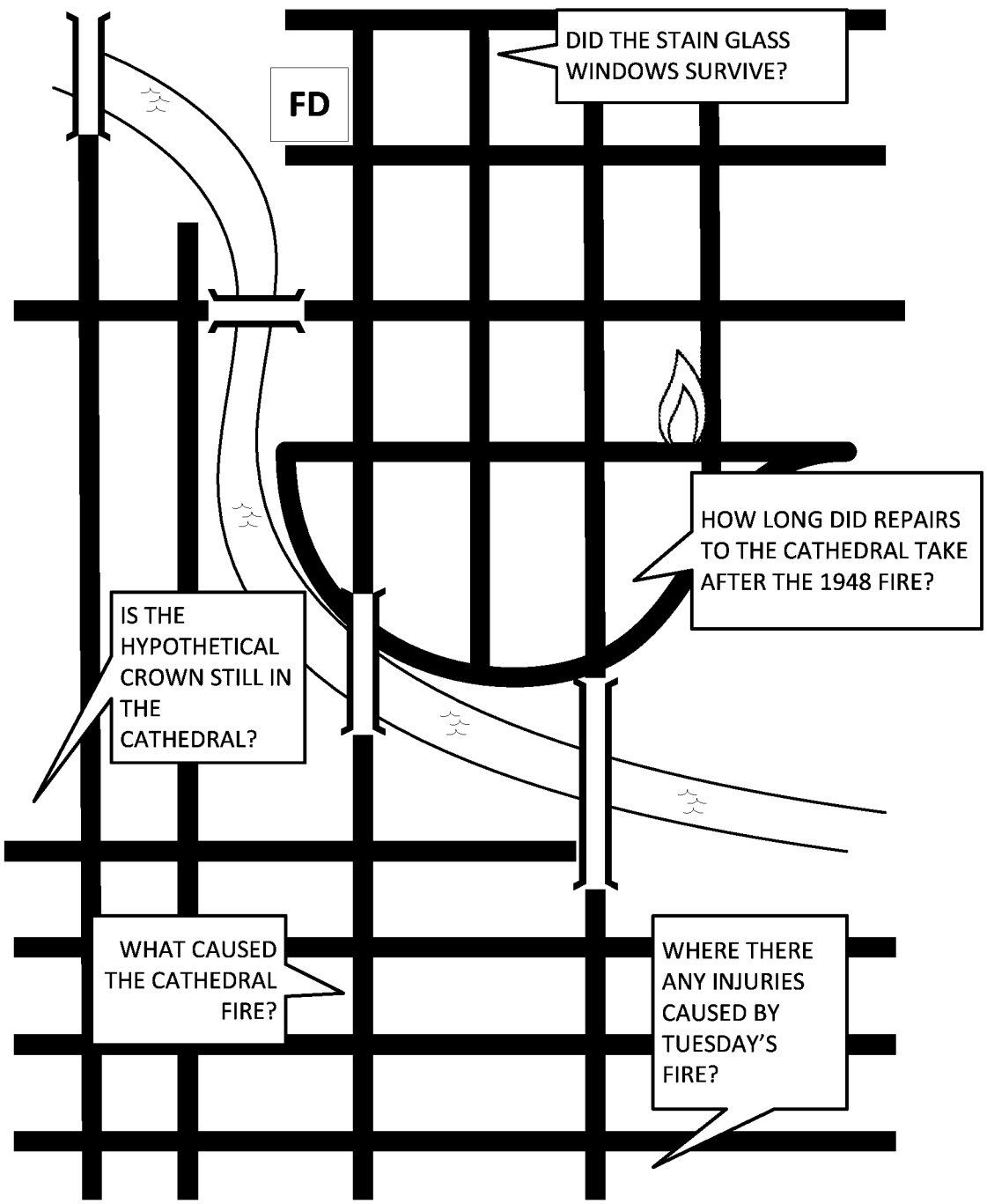
FIG. 3 depicts the example scenario of FIG. 2 after the event has been detected, when live data streams and/or search engine queries are analyzed to determine additional information about the developing event.

FIG. 3 depicts the example scenario of FIG. 2 after the developing event has been established (e.g., a confidence measure that the developing event is real satisfies some threshold). At this point, live data streams and/or search engine queries may be analyzed to determine additional information about the developing event. These data may then be leveraged to provide information to other inquiring users. Although the events of FIG. 3 temporally follow those of FIG. 2, they may still be relatively "fresh" such that conventional information sources such as knowledge graph 138 and/or search engines are not yet fully informed.

In FIG. 3 a northern user submits a search engine query, "Did the stain glass windows survive?" This query may be determined, e.g., by query monitor 132, to be semantically-related to the developing cathedral fire event, e.g., because "stain glass windows" may have a relatively strong semantic relationship with cathedrals in general, and the word "survive" suggests occurrence of some destructive event, e.g., a fire. Another user relatively close to the fire asks, "How long did repairs to the cathedral take after the 1948 fire?" Yet another user in the far south of the city asks, "Where there any injuries caused by Tuesday's fire?" A southwestern user asks, "What caused the cathedral fire?" A western user asks, "Is the hypothetical crown still in the cathedral?" Any of these queries, whether they are yet answerable by a conventional data source such as a search engine or knowledge graph 138, may be leveraged to quickly disseminate new information about the developing event to interested users.

Figure 4:
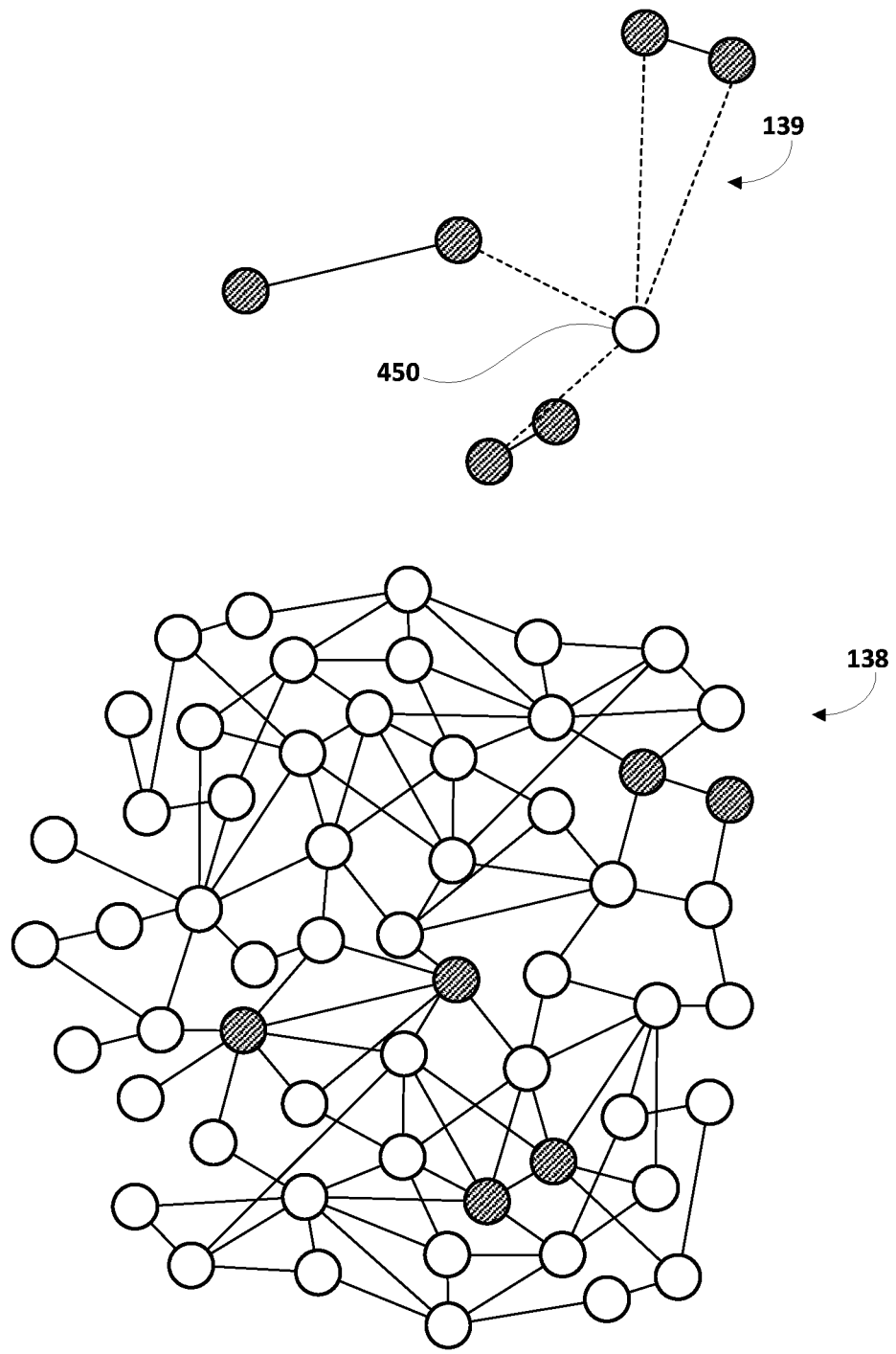
FIG. 4 schematically illustrates how an event-specific provisional knowledge graph may be generated based in part from a general-purpose knowledge graph.

FIG. 4 schematically demonstrates how an event-specific provisional knowledge graph 139 may relate to a conventional knowledge graph 138, in accordance with various implementations. In FIG. 4, general-purpose or conventional knowledge graph 138 includes a plurality of entity nodes and a plurality of edges between the plurality of entity nodes. The plurality of entity nodes may represent entities and the plurality of edges may represent relationships between the entities. Event-specific knowledge graph 139 also includes entity nodes and edges, but is considerably smaller than regular knowledge graph 138. In reality, regular knowledge graph 138 almost certainly would be far more massive than what is depicted in FIG. 4. The limited number of nodes and edges of knowledge graph 138 depicted in FIG. 4 are for illustrative purposes only.

As described previously, various components, such as live stream monitor 134 and/or provisional knowledge graph manager 136, may analyze two or more live data streams. Based on this analysis, one or more entities associated with a developing event may be identified. In some implementations, the one or more identified entities may form part of and/or be identified from general-purpose knowledge graph 138, as depicted by the shaded nodes of general-purpose knowledge graph 138 in FIG. 4.

Based on the identified one or more entities, event-specific provisional knowledge graph 139 associated with the developing event may be constructed (or updated if it already exists). As shown in FIG. 4, event-specific provisional knowledge graph 139 shares one or more entity nodes with general-purpose knowledge graph 138. However, event-specific provisional knowledge graph 139 includes one or more additional nodes or edges, such as developing event node 450, that are not found in general-purpose knowledge graph 138. These new nodes and/or edges may convey a relationship between the identified one or more entities and the developing event.

Once event-specific provisional knowledge graph 139 is created, it may be used for various purposes. In some implementations, event-specific provisional knowledge graph 139 may be queried for information about the developing event. For example, a user query seeking information relating to the developing event may be received, e.g., by knowledge system 130. Knowledge system 130 may determine that general-purpose knowledge graph 138 does not include information responsive to the user query. Before knowledge system 130 notifies the querying user that responsive information is not yet available, knowledge system 130 may query event-specific provisional knowledge graph 139 for information about the developing event. Assuming event-specific provisional knowledge graph 139 includes responsive information, knowledge system 130 may obtain and return this responsive information from event-specific provisional knowledge graph 139 (in some cases with an annotation or notification that the information may not be corroborated).

In some implementations, one or more components of event-specific provisional knowledge graph 139 may be merged or otherwise incorporated into general-purpose knowledge graph 138 once those components are sufficiently corroborated and/or verified. Additionally or alternatively, one or more nodes or edges of event-specific provisional knowledge graph 139 may be deleted and/or merged into existing nodes of general-purpose knowledge graph 138 once the facts and/or relationships they represent are no longer needed or in sufficient demand to warrant keeping the event-specific provisional knowledge graph 139 around.

Individuals may be subscribed to information about developing events in various ways. In some implementations, an individual may be one of the people that issued an early query related to the developing event, like those queries of FIG. 3 ("Did the stain glass windows survive?" or "What caused the cathedral fire?"). As more information about the developing event is learned, e.g., from one or more live data streams, event-specific provisional knowledge graph 139 associated with that developing event may be updated. As event-specific provisional knowledge graph 139 is updated, the individual may receive updates with information that has not yet been presented to them. More generally, in some implementations, an individual that issues a query about the developing event, regardless of whether that individual's query contributed to the initial detection of the developing event, may effectively cause that individual to be "subscribed" to receiving updates from the event-specific provisional knowledge graph as they become available.

Figure 5:
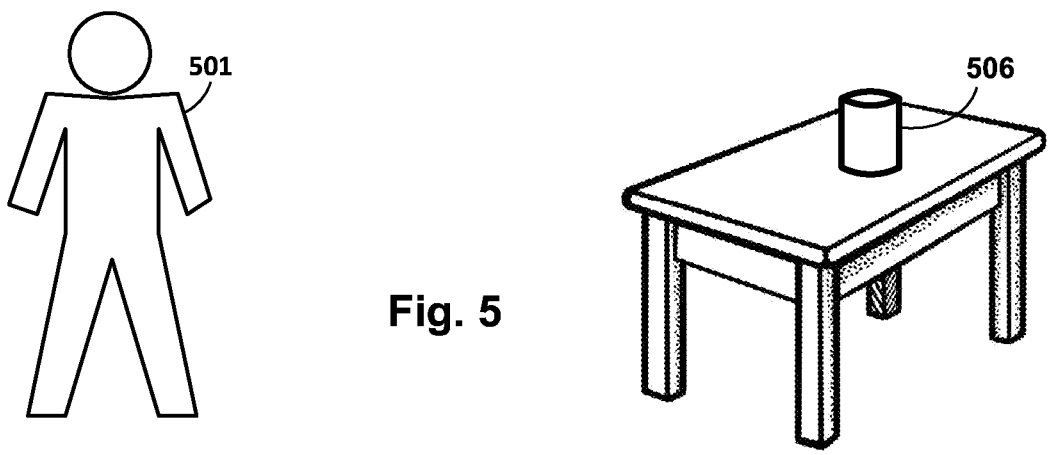
FIG. 5 and FIG. 6 depict examples of how techniques described herein may be employed to provide an individual with updates about a developing event.
Figure 6:
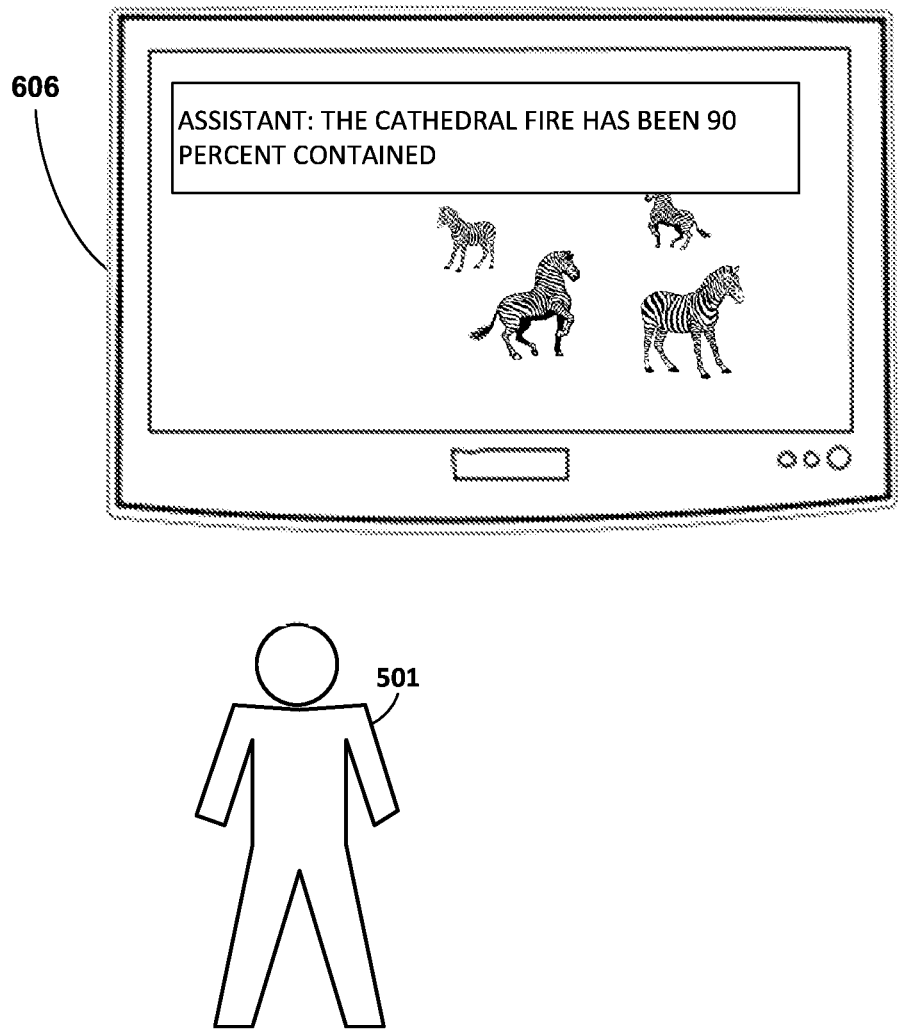

FIGS. 5-6 depict an example of how a user 501 may subscribe to, and later receive updates associated with, information about a developing event. In FIG. 5, client device 506 takes the form of a standalone interactive speaker. Client device 506 includes various components commonly found in such client devices, such as a microphone to capture utterance(s) by a user 501, which are not described herein in detail. In FIG. 5, user 501 has invoked automated assistant 120 to pose the question, "Tell me about the cathedral fire." Knowledge system 130 may not yet have information about a recent cathedral fire, and therefore responds, "Many cathedrals and religious buildings have burned throughout history. What cathedral are you referring to?"

At this point, knowledge system 130 was unable to provide responsive information for automated assistant 120 to provide. However, in various implementations, query monitor 132 may be set into motion and may, e.g., in conjunction with live stream monitor 134, begin to select and/or analyze one or more live data streams and/or queries submitted to knowledge system 130 to determine whether there is potentially a developing event unfolding that relates to a cathedral burning.

In FIG. 5, user 501 responds, "I'm talking about the fire that's happening right now downtown." This response contains multiple pieces of information that query monitor 132 and/or live stream monitor 134 may utilize to better identify and/or analyze live data streams and/or queries as providing information about a potential developing event. In particular, it is now clear that the fire is very recent ("happening right now") and it is happening "downtown," which may narrow to the closest metropolitan area near user 501. Query monitor 132 and/or live stream monitor 134 may select queries and/or live data streams generated very recently near the downtown area to ascertain information about the developing event.

From updates obtained from these live data streams, provisional knowledge graph manager 136 may generate and/or update an event-specific provisional knowledge graph 139 associated with the developing "cathedral fire" event. Once this event-specific provisional knowledge graph 139 is established, it may be subsequently updated as new information is discovered from subsequent queries/live stream updates, and can be queried for additional information about the developing event. Meanwhile, automated assistant says, "OK, let me do some digging . . . ."

For example, after some amount of time passes in FIG. 5 (a few seconds, a few minutes, etc.), automated assistant 120 follows up, proactively without requiring additional invocation from user 501, with additional information about the developing event: "OK, Here's what I found: One source said that the fire has enveloped the nave. Another source said the fire was caused by lighting. Another source said one minute ago that the fire department is just arriving."

Notably, in some implementations, if a particular live stream update or query identifies a point in time or a relative time at which some development in the developing event occurs (e.g., "just" in the update, "the fire department is just arriving"), automated assistant 120 or another component e.g., provisional knowledge graph manager 136, live stream monitor 134, etc., may add additional temporal explanation (e.g., "one minute ago") so that user 501 gets a better idea of when the alleged development occurred, or at least when the live stream update of the event occurred. Similarly, if a live stream update or query offers some relative geographic information (e.g., "across the river," "in my building," etc.), automated assistant 120 and/or another component may identify the source's location (e.g., using GPS coordinates) and use that to offer addition information about the context of the source's post, such as "one source located south of the river said there's a lot of smoke across the river."

FIG. 6 depicts an example of how the same user 501 may later receive updates about the developing event, e.g., outside of the dialog session with automated assistant 120 in which user 501 initially asked about the developing event. In FIG. 6, user 501 is watching television on a client device 606 taking the form of a "smart" television that is, for instance, natively configured with automated assistant client 108 and/or has an assistant-configured dongle installed. In either case, automated assistant 120 is pushed, or requests, updates from event-specific provisional knowledge graph 139 associated with the cathedral fire event. When new information is determined, user 501 receives an update from automated assistant 120. For example, in FIG. 6, automated assistant 120 proactively, and without user 501 requesting it, provides visual output overlaying the content rendered on client device 606, "The cathedral fire has been 90 percent contained."

In various implementations, individuals may be subscribed to receive updates on developing events in response to other occurrences than those individuals submitting search queries about the events. In some implementations, an event type of a developing event may be used to determine whether to subscribe particular individuals. For example, some individuals may be interested in political protests. When a new developing event is detected, e.g., by query monitor 132 and/or live stream monitor 134, and estimated (e.g., by provisional knowledge graph manager 136) to be a political protest, at least some of those individuals interested in political protests may be subscribed to receive updates automatically. Other signals may factor into such a decision, such as proximity to the developing event and/or a scope of the developing event. For example, an individual in Oregon who is interested in political protests might not necessarily be interested in political protests in faraway states such as Kentucky, especially if the scope of those protests is limited to Kentucky politics. By contrast, the same individual may be interested in nearby political protests even if the scope of those protests is limited to Oregon politics. And the same individual may be interested in faraway protests of national scope, such as protests in Washington DC or elsewhere that relate to national politics, instead of local or regional politics.

An event type of a developing event may be predicted/estimated in various ways. In some implementations, one or more live data streams may be analyzed, e.g., by provisional knowledge graph manager 136, as described previously to parse and analyze data about the developing event. This analysis may include comparing the data to one or more "event type templates." An event type template may be associated with a particular event type, e.g., protest, riot, disaster, sporting event, concert, political rally, criminal act, terrorist attack, etc. The event type template may include "slots" associated with expected event type data points that are typically associated with the particular event type. For example, a sporting event type template may include slots for "scores," "players," "coaches," "attendance," "teams," and other data points typically found in social media posts related to sporting events. A "building fire" event type template may include slots for "fire," "flames," "smoke," "firetrucks," "EMS," "hoses," and other data points typically found in social media posts related to building fires.

In some implementations, in addition to or instead of an event type template, the event-specific provisional knowledge graph 139 and/or data indicative of its constituent entities/edges may be applied as input across one or event type machine learning models, such as a support vector machine, neural network, graph neural network, graph convolutional network, graph attention network, etc. Such a machine learning model may be trained to generate output that predicts an event type of the event. For example, a neural network may be trained using training examples that each include a plurality of features extracted from an event of a known event type. Each training example may be labeled with a corresponding event type. A loss function of the machine learning model may be a difference between the output of the model generated by application of a training example across the model and a label assigned to the training example. The loss function may then be used to train the model, e.g., using techniques such as gradient descent, back propagation, etc.

In some implementations, a single machine learning model may generate multiple outputs representing multiple probabilities that the event is of multiple different event types. In some such implementations, the event type having the highest probability may be selected as the presumptive event type of the developing event. Additionally or alternatively, in some implementations, multiple machine learning models or classifiers may be individually trained to generate output indicative of a particular event type.

In other implementations, features of a developing event may be applied as input across a machine learning model to generate a semantically-rich, latent space embedding. This embedding's distance from other "reference" embeddings in the latent space may be indicative of the embedding's similarity to those reference embeddings. If those nearby reference embeddings were generated from a developing event of a particular type, then the new embedding—and hence, the developing event from which it was generated—may be estimated to be the same kind of event.

In some implementations, a developing event and its event-specific provisional knowledge graph 139 may be assigned multiple candidate event types, each with a corresponding probability of being the correct event type. As more information is learned about the developing event and event-specific provisional knowledge graph 139 is updated, these probabilities may change. For example a developing event may initially be classified as most likely being a political protest, but also potentially a political rally or riot. However, as participants in the event become agitated and/or violent, the developing event may be reclassified as most likely being a riot (or classified as both a political rally and a riot if it is determined that the event started as a political rally but evolved into a riot). In some such implementations, an individual may receive updates about the developing event initially because the developing event is classified as an event type in which the individual is interested. However, once the developing is reclassified as a different event type of which the individual is not interested, the individual may be unsubscribed from receiving updates about the developing event.

Figure 7:
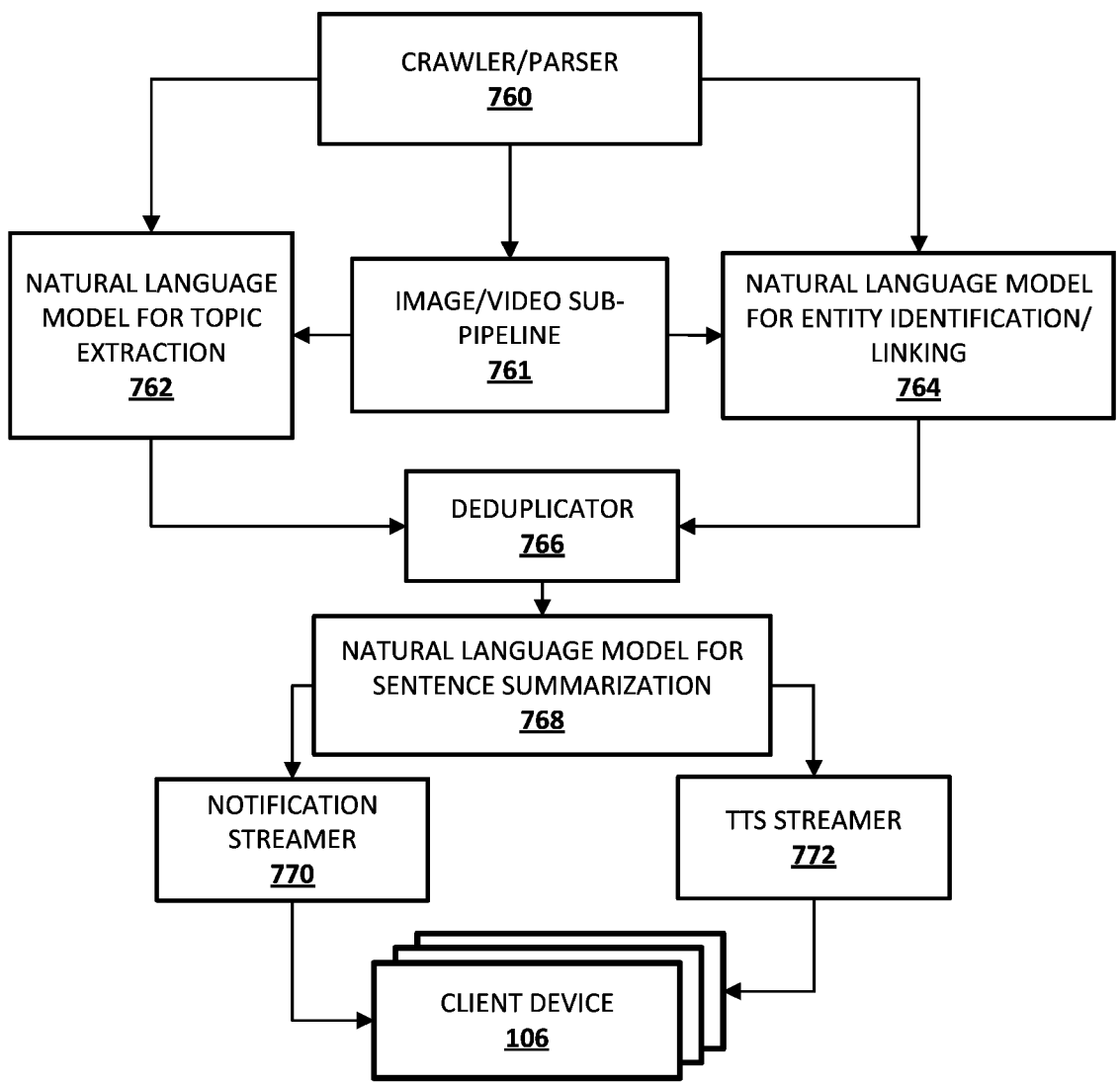
FIG. 7 depicts an example data processing pipeline configured with selected aspects of the present disclosure.

FIG. 7 depicts a data processing pipeline 700 that may be implemented by knowledge system 130 in various implementations. The constituent components of data processing pipeline 700 may be distributed across one or more of query monitor 132, live stream monitor 134, provisional knowledge graph manager 136, and/or any other components of knowledge system 130 that are different than those components depicted in FIG. 1.

In various implementations, crawler/parser 760 may be configured to crawl various sources of live data streams 142, such as social networks 140/144, to identify and/or select live data streams that may include information relevant to a developing event under consideration. For example, suppose knowledge system 130 receives an initial search query about an event that is too fresh to yet be documented in general-purpose knowledge graph 138. Live stream monitor 134 and/or provisional knowledge graph manager 136 may identify live data streams 142 and/or other search queries submitted using computing devices known to be geographically proximate to, for instance, a location identified in the initial search query, and/or to coordinates generated by a computing device used to submit the initial search query. Crawler/parser 760 may then parse one or more textual updates (e.g., social media posts) received through each identified live data stream for information of potential relevance to the developing event.

In some implementations, an image/video sub-pipeline 761 may be configured to crawl and/or process non-textual updates from one or more live data streams. These non-textual updates may include, for instance, images, videos, audio files, etc. In the case of images (and/or videos), various image processing techniques, such as optical character recognition, object detection, facial recognition, etc., may be used to identify objects and/or text depicted in images published on live data streams. These identified objects and/or text may then be analyzed by components of pipeline 700 described below, e.g., to identify one or more entities, to determine information about developing events depicted in the images, etc. In the case of audio data published on live data streams, speech recognition processing may be applied to extract text related to developing event information.

The parsed (and in some cases annotated) output generated by crawler/parser 760 and/or the output of image/video sub-pipeline 761 may be analyzed using one or more natural language processing ("NLP") models for topic extraction 762 and/or entity identification/linking 764. NLP model for topic extraction 762 may take the form of a statistical model such as a probabilistic latent semantic analysis ("PLSA") model, a latent Dirichlet allocation ("LDA"), a Pachinko allocation, etc. NLP model for entity identification/linking 764 may take a form similar to the "entity tagger" described previously as part of natural language processor 122 of automated assistant 120. In fact, in some implementations, cloud-based automated assistant components 119 such as natural language processor 122 and/or natural language generator 126 may be implemented as part of knowledge system 130. In some such implementations, natural language processor 122 may be used to both implement automated assistant 120 and/or as part of data processing pipeline 700.

The output of components 762 and 764 may be processed by a de-duplicator 766 to ensure that entities and/or relationships are not duplicated within event-specific provisional knowledge graph 139. De-duplicator 766 may determine, for example, which information is new information and which information is repeated information. For example, it is not uncommon for a first user to post a live stream update (e.g., text, image, video, audio, etc.), and for then followers of that first user repost that same update so that their own downstream followers can see it. For purposes of populating an event-specific provisional knowledge graph 139, however, the reposted updated may not be useful for gaining new information, although it may be used for other purposes, such as to corroborate or verify the information conveyed in the reposted update. In some such cases, the reposted data may be discarded or otherwise disregarded.

When receiving updates about developing events, individual subscribers may not wish to simply receive regurgitated live stream updates. They may prefer to have information extracted from those live stream updates and presented in a naturalistic way. Accordingly, a natural language model for sentence summarization 768 may be provided that, for instance, share one or more characteristics with natural language generator 126 of automated assistant 120. In particular, natural language model for sentence summarization 768 may facilitate generation of sentences (or more generally, natural language) that summarizes information received from one or more live data streams.

Notification streamer 770 and TTS streamer 772 may generally be configured to provide new information about a developing event to individuals that are subscribed to the developing event, e.g., for presentation as rendered output on one or more client devices 106. In some implementations an individual may query event-specific provisional knowledge graph 139 at any point in time for information about a developing event. By contrast, components 770 and 772 may be configured to "push" new information generated by upstream components 760-766 of pipeline 700 to subscribed individuals, e.g., so that the new information is "surfaced" to those individuals without them necessarily specifically requesting it. As used herein, "surfacing" content to an individual means outputting that content on one or more computing devices operated by the individual, e.g., audibly and/or visually. In some cases, surfacing may refer to providing a notification (e.g., a card, pop-up notification, audio alert, etc.) that is presented to the individual regardless of whether the individual is currently engaged in a task and/or even operating the client device. For example, information may be surfaced to a user by presenting a "card" on a home or lock screen of a smart phone or tablet computing device, or by overlaying the notification on a television screen as described previously with regard to FIG. 6.

Notification streamer 770 may be configured to process parsed and/or annotated content generated by upstream components of pipeline 700, and to generate content that is to be primarily rendered visually on a display of a computing device. This content may be presented as cards, pop-up notifications, banners, streamers, lists, etc.

TTS streamer 772 may be configured to process parsed and/or annotated text from generated from upstream components of pipeline 700, and to convert that text into speech output that can be provided to the individual audibly or visually, e.g., by automated assistant 120. In some such implementations, automated assistant 120 may provide these speech output updates proactively, e.g., without the individual requesting them, as new information about the developing event comes in and/or is determined to be sufficiently reliable.

In some implementations, TTS stream 772 (or notification streamer 770) may use various signals to determine which information and/or how much information to surface to a particular individual about a developing event. For example, an available output modality of a computing device operated by the individual might be considered. A user driving a car configured with an assistant-enabled computing system and/or or a user near a standalone interactive speaker may be available to receive notifications audibly, e.g. via a speaker. However, audio notifications can be distracting or irritating if provided too frequently or if they don't contain new information. Accordingly, components 770-772 may provide individuals that are reachable via audio outputs with less frequent updates than, say, other individuals (e.g., sitting in front of computer screens) who are available to receive visual updates.

Other signals that may be used by components 770-772 to determine how much and/or whether to surface live stream updates to an individual about a developing event include, but are not limited to, a confidence in event type(s) currently associated with a developing event, user preferences (both in general and in relation to particular developing event types), past individual behavior (did they previously reject surfaced information, or request more information than was surfaced proactively?), and so forth. With some event types, such as sporting events, subscribing individuals may expect more frequent updates, e.g., whenever someone scores, is injured, is fouled, etc. With other event types, such as political rallies, the individual may wish to receive less frequent updates. In some implementations, information about a developing event may be proactively surfaced to a subscribed individual only if the information has not already been presented to the individual and/or if the information is from a source that is deemed sufficiently reliable.

In some implementations, components 770-772 may be configured to inform subscribers when an event type has changed, e.g., so that individuals may decide whether they wish to continue receiving updates. For example, politically-minded subscribers may receive updates about a developing event that is initially classified as a spontaneous political rally. However, as more information from more live streams and/or search queries is analyzed, it may become clear that the rally is not political in nature, but instead is a "pep" rally intended to excite a fan base of a particular sports team. Those politically-minded subscribers may be informed of the new event type, e.g., so that they can unsubscribe if they so choose.

In some implementations, an individual receiving updates about a developing event may be able to request, e.g., using speech input or by interacting with a graphical user interface, information about source(s) of a particular update. That may enable the individual to make his or her own determination about how reliable the particular update is or isn't. In some cases, the individual may be able to provide feedback about the source that can be used in association with that individual or more broadly across a population when analyzing subsequent live stream updates from that source. For example, if an individual determines that a developing event was mischaracterized as a political rally when it really was a pep rally, the individual can flag one or more sources that lead to the developing event being classified as a political rally, e.g., so that those sources are "demoted" (e.g., trust in those sources is decreased) moving forward.

Figure 8:
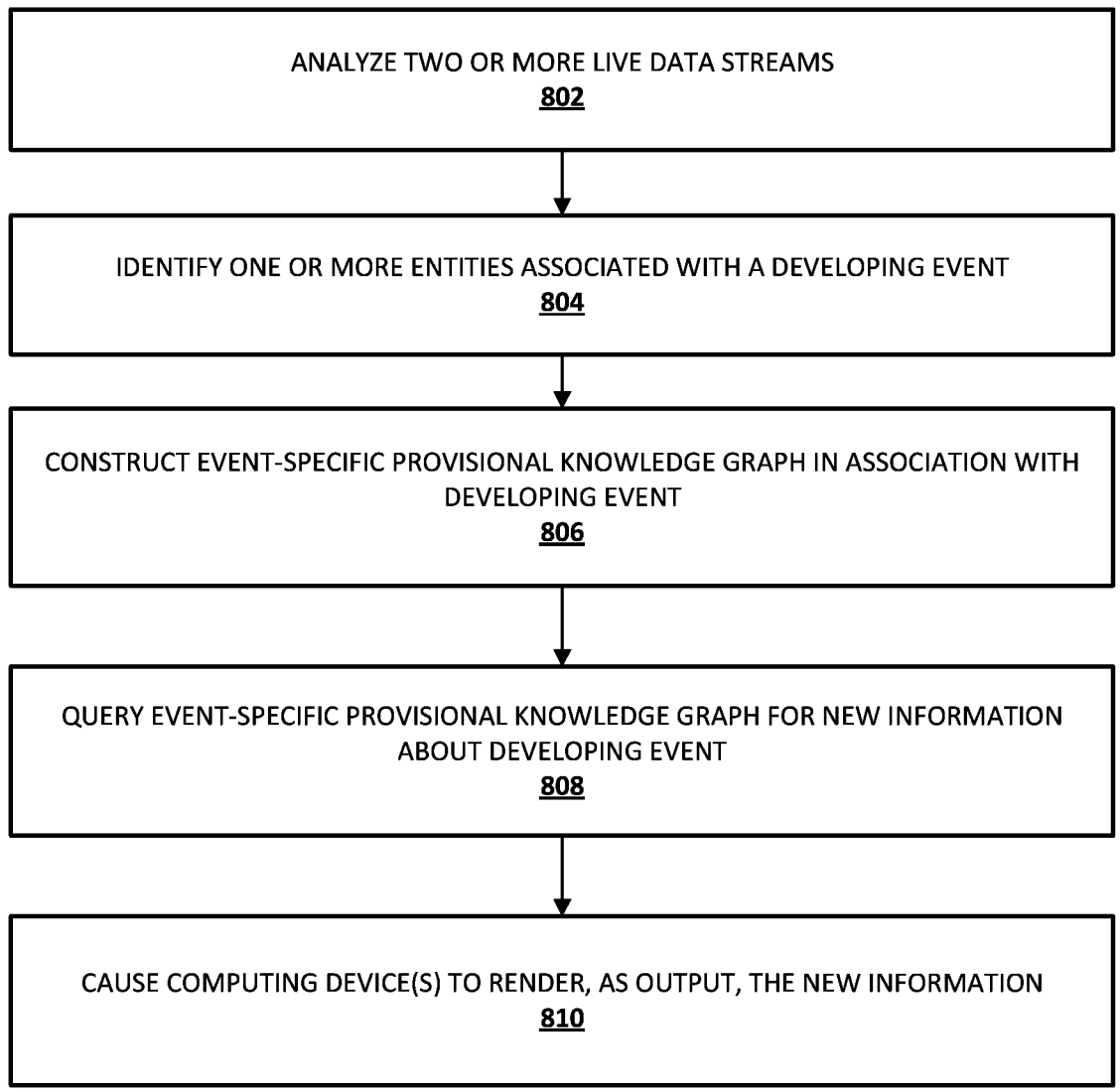
FIG. 8 depicts a flowchart illustrating an example methods for practicing selected aspects of the present disclosure.

FIG. 8 is a flowchart illustrating an example method 800 according to implementations disclosed herein. For convenience, the operations of the flow chart are described with reference to a system that performs the operations. This system may include various components of various computer systems, such as one or more components of computing systems that implement automated assistant 120. Moreover, while operations of method 800 are shown in a particular order, this is not meant to be limiting. One or more operations may be reordered, omitted or added.

At block 802, the system, e.g., by way of live stream monitor 134 and/or crawler/parser 760, may analyze two or more live data streams. As described previously, in some implementations, the system may select a set of live data streams 142 that are deemed to be particularly reliable and/or quick to report new information, such as reporters' live streams, first responders' live streams, etc. Additionally or alternatively, in some implementations, the system may select and begin monitoring two or more live data streams based on the sources of those streams being presumptively near a developing event.

Based on the analyzing, at block 804, the system may identify one or more entities associated with a developing event. In various implementations, the one or more entities may form part of general-purpose knowledge graph 138 that, as described previously, includes a plurality of entity nodes and a plurality of edges between the plurality of entity nodes, with the plurality of entity nodes representing entities and the plurality of edges representing relationships between the entities. In other implementations, presumed entities may be provisionally identified based on the analyzing, even if those presumed entities cannot be immediately matched to established entities in general-purpose knowledge graph 138.

Based on the identified one or more entities, at block 806 an event-specific provisional knowledge graph 139 may be constructed (or updated if it has already been constructed) in association with the developing event. As described previously, the event-specific provisional knowledge graph may share one or more entity nodes with the general-purpose knowledge graph, but also may include one or more additional nodes or edges, not found in the general-purpose knowledge graph, that convey a relationship between the identified one or more entities and the developing event.

In some implementations, in response to the constructing or updating of block 806, or periodically/continuously, at block 808, the system may query event-specific provisional knowledge graph 139 for new information about the developing event. At block 810, the system, e.g., by way of notification streamer 770 and/or TTS streamer 772, may cause one or more computing devices to render, as output, the new information.

Figure 9:
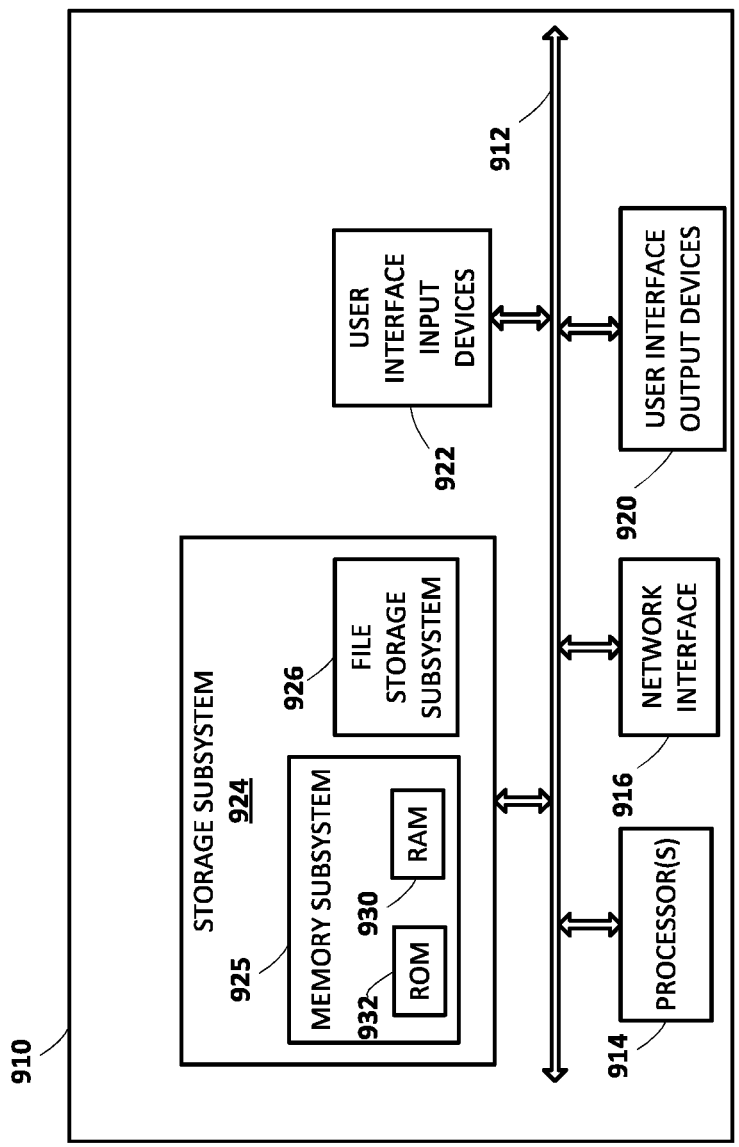
FIG. 9 illustrates an example architecture of a computing device.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the pipeline 700 of FIG. 7, the method of FIG. 8, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    analyzing two or more live data streams;
    based on the analyzing, newly detecting a developing event and identifying one or more entities associated with the newly-detected developing event;
    in response to newly detecting the developing event, and based on the identified one or more entities, constructing an event-specific provisional knowledge graph associated with the newly-detected developing event;
    querying the event-specific provisional knowledge graph for first information about the newly-detected developing event;
    causing one or more computing devices to render, as first output, the first information about the newly-detected developing event;
    subsequent to the constructing, monitoring one or more of the live data streams to corroborate or verify one or more elements of the event-specific provisional knowledge graph; and
    subsequent to the causing, and in response to corroboration or verification of the one or more elements of the event-specific provisional knowledge graph, merging one or more of the elements of the event-specific provisional knowledge graph with a general-purpose knowledge graph, whereby the general-purpose knowledge graph is subsequently searchable for information related to the developing event.

2. The method of claim 1, wherein the first output comprises an annotation that indicates the first information is uncorroborated.

3. The method of claim 2, further comprising:
    subsequent to the merging, querying the general-purpose knowledge graph for second information about the newly-detected developing event; and
    causing one or more of the computing devices to render, as second output, the second information about the newly-detected developing event.

4. The method of claim 3, wherein the second output comprises an annotation that indicates the second information is corroborated.

5. The method of claim 1, wherein one or more of the entities associated with the newly-detected developing event forms part of the general-purpose knowledge graph, wherein the general-purpose knowledge graph includes a plurality of entity nodes and a plurality of edges between the plurality of entity nodes, wherein the plurality of entity nodes represent entities and the plurality of edges represent relationships between the entities.

6. The method of claim 5, wherein the event-specific provisional knowledge graph shares one or more entity nodes with the general-purpose knowledge graph.

7. A system comprising one or more processors and memory storing instructions that, in response to execution by the one or more processors, cause the one or more processors to:
analyze two or more live data streams;
based on the analysis, newly detect a developing event and identify one or more entities associated with the newly-detected developing event;
in response to the developing event being newly detected, and based on the identified one or more entities, construct an event-specific provisional knowledge graph associated with the newly-detected developing event;
query the event-specific provisional knowledge graph for first information about the newly-detected developing event;
cause one or more computing devices to render, as first output, the first information about the newly-detected developing event;
subsequent to the event-specific provisional knowledge graph being constructed, monitor one or more of the live data streams to corroborate or verify one or more elements of the event- specific provisional knowledge graph; and
subsequent to the first output being rendered, and in response to corroboration or verification of the one or more elements of the event-specific provisional knowledge graph, merge one or more of the elements of the event-specific provisional knowledge graph with a general-purpose knowledge graph, whereby the general-purpose knowledge graph is subsequently searchable for information related to the developing event.

8. The system of claim 7, wherein the first output comprises an annotation that indicates the first information is uncorroborated.

9. The system of claim 8, further comprising instructions to:
query the general-purpose knowledge graph for second information about the newly-detected developing event; and
transmit second data to one or more computing devices, wherein the second data is configured to be rendered as second output that includes the second information about the newly-detected developing event.

10. The system of claim 9, wherein the second output comprises an annotation that indicates the second information is corroborated.

11. The system of claim 7, wherein one or more of the entities associated with the newly-detected developing event forms part of the general-purpose knowledge graph, wherein the general-purpose knowledge graph includes a plurality of entity nodes and a plurality of edges between the plurality of entity nodes, wherein the plurality of entity nodes represent entities and the plurality of edges represent relationships between the entities.

12. The system of claim 11, wherein the event-specific provisional knowledge graph shares one or more entity nodes with the general-purpose knowledge graph.

13. At least one non-transitory computer-readable medium comprising instructions that, in response to execution by one or more processors, cause the one or more processors to:
analyze two or more live data streams;
based on the analysis, newly detect a developing event and identify one or more entities associated with the newly-detected developing event;
in response to the developing event being newly detected, and based on the identified one or more entities, construct an event-specific provisional knowledge graph associated with the newly-detected developing event;
query the event-specific provisional knowledge graph for first information about the newly-detected developing event;
cause one or more computing devices to render, as first output, the first information about the newly-detected developing event;
subsequent to the event-specific provisional knowledge graph being constructed, monitor one or more of the live data streams to corroborate or verify one or more elements of the event- specific provisional knowledge graph; and
subsequent to the first output being rendered, and in response to corroboration or verification of the one or more elements of the event-specific provisional knowledge graph, merge one or more of the elements of the event-specific provisional knowledge graph with a general-purpose knowledge graph, whereby the general-purpose knowledge graph is subsequently searchable for information related to the developing event.

14. The at least one non-transitory computer-readable medium of claim 13, wherein the first output comprises an annotation that indicates the first information is uncorroborated.

15. The at least one non-transitory computer-readable medium of claim 14, further comprising instructions to:
query the general-purpose knowledge graph for second information about the newly-detected developing event; and
transmit second data to one or more computing devices, wherein the second data is configured to be rendered as second output that includes the second information about the newly-detected developing event.

16. The at least one non-transitory computer-readable medium of claim 15, wherein the second output comprises an annotation that indicates the second information is corroborated.

17. The at least one non-transitory computer-readable medium of claim 13, wherein one or more of the entities associated with the newly-detected developing event forms part of the general-purpose knowledge graph, wherein the general-purpose knowledge graph includes a plurality of entity nodes and a plurality of edges between the plurality of entity nodes, wherein the plurality of entity nodes represent entities and the plurality of edges represent relationships between the entities.

* * * * *